United States Patent [19]

Gajjar

[11] Patent Number: 4,745,391
[45] Date of Patent: May 17, 1988

[54] METHOD OF, AND APPARATUS FOR, INFORMATION COMMUNICATION VIA A POWER LINE CONDUCTOR

[75] Inventor: Jagdish T. Gajjar, Clifton Park, N.Y.

[73] Assignee: General Electric Company, Schenectady, N.Y.

[21] Appl. No.: 19,390

[22] Filed: Feb. 26, 1987

[51] Int. Cl.⁴ ............................................ H04M 11/04
[52] U.S. Cl. .............................. 340/310 A; 340/310 R; 375/37; 455/3; 333/32
[58] Field of Search ........ 340/310 A, 310 R, 310 CP, 340/538; 361/58, 60, 64; 375/7, 37; 333/24 R, 25, 32; 455/3, 7, 14

[56] References Cited

U.S. PATENT DOCUMENTS

| | | | |
|---|---|---|---|
| 4,308,619 | 12/1981 | Hughes | 340/310 A |
| 4,538,136 | 8/1985 | Drabing | 340/310 R |
| 4,636,771 | 1/1987 | Ochs | 340/310 A |

Primary Examiner—Donnie L. Crosland
Attorney, Agent, or Firm—Geoffrey H. Krauss; James C. Davis, Jr.; Marvin Snyder

[57] ABSTRACT

A method for transmission of information, received at a transmitter of a power distribution system, over at least one conductor of that distribution system, requires the reception, at the transmitter, also of at least one PLC signal at a power-line communications (PLC) frequency and from an associated first conductor portion of the system. The transmitter processes the local data signal and the PLC signal to generate another PLC signal, also at the PLC frequency, which is coupled through the non-saturating core of a transmitter-coupling current transformer to inject a PLC current into a second conductor portion of the system. The PLC signal is eventually received by a receiver, connected to a system conductor at a location different from the location of the transmitter, and the transmitted information is recovered therefrom.

20 Claims, 2 Drawing Sheets

METHOD OF, AND APPARATUS FOR, INFORMATION COMMUNICATION VIA A POWER LINE CONDUCTOR

BACKGROUND OF THE INVENTION

The present invention is concerned with power line carrier (PLC) information communication and, more specifically, with a method of, and apparatus for, utilizing magnetic coupling for exciting high-frequency PLC information onto and through system conductors.

It is often desirable to transmit information via one or more power line conductors, between locations adjacent to the conductors themselves. In order to carry out PLC communication, it is first necessary to effectively couple a PLC signal onto the involved system conductor. It has been found that the use of magnetic coupling often requires that several turns of wire be placed around a magnetic core, to maximize the coupling efficiency. However, the flow of current at the normal power line frequency (60 Hz in the United States) in the same coil generally causes the magnetic core to saturate, so that the PLC signal encounters a loss of coupling, production of non-linear intermodulation products, and the like deleterious consequences. A further impediment occurs if the conductor, into which the PLC signal current is to be injected, must be broken in order to insert a coupling coil; many safety regulations prohibit the breaking of the circuit conductors, especially when involving a neutral conductor, which is almost always required to be continuous. Further, it is often required that PLC signals be propagated around certain circuit elements, such as power-factor-correction capacitors, distribution transformers, and the like, which tend to act as undesirable impedances (or, even worse, as open circuits or short circuits) at the PLC frequency. Thus, it is highly desirable to provide a method and apparatus allowing the coupling of PLC information signals (at PLC frequencies at least two orders of magnitude higher than the power line frequency) to at least one distribution conductor, carrying the power frequency currents to system loads, while minimizing the impedance seen by those power frequency currents (and thus minimizing the power system losses) due to the PLC system components.

BRIEF SUMMARY OF THE INVENTION

In accordance with the invention, a method for transmission of information over at least one conductor of a power distribution system, comprises the steps of: receiving, at a transmitter, a local data signal containing the information to be transmitted; also receiving, at the transmitter, at least one PLC signal, each at a power-line-communications (PLC) frequency and each from an associated first conductor portion of the system; then processing the local data signal and the PLC signal to generate in the transmitter another PLC signal, also at the PLC frequency; coupling at least a portion of the another PLC signal through the non-saturating core of a transmitter-coupling current transformer to inject a PLC current into a second conductor portion of the system; and eventually, recovering the transmitted information with a receiver connected to a system conductor at a location different from the location of the transmitter.

In presently preferred embodiments, the first and second conductor portions can be part of the same or different conductors, while each PLC input can be from the same or different conductors. Use of a transmitter with differential amplifier, driving a current transformer with a non-saturating core, allows the PLC signal to be coupled directly to the system conductor(s); the differential amplifiers; low output impedance is, at the power frequency, at least one order of magnitude less than the output impedance at the higher PLC frequency. Suitable frequency conversion, filtering and other processing means add to system versatility.

Accordingly, it is an object of the present invention to provide methods of, and apparatus for, transmitting power line carrier information signals over at least one conductor of a power distribution circuit, without appreciably affecting the power frequency currents flowing through the same conductors, from power-providing sources to power-consuming loads.

This and other objects of the present invention will become apparent upon reading of the following detailed description, when considered in conjunction with the drawings.

DETAILED DESCRIPTION OF THE INVENTION

Figure 1:
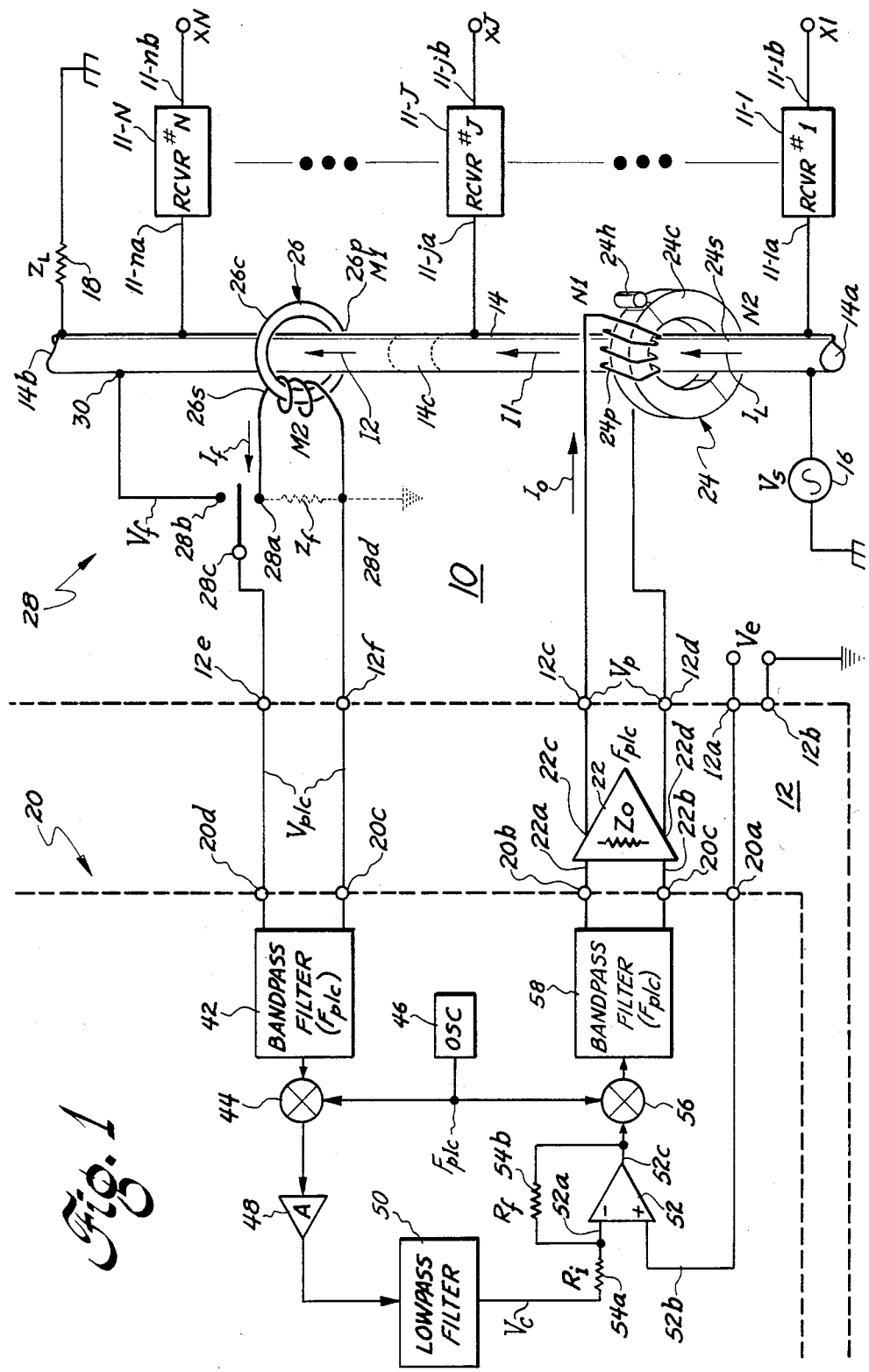
FIG. 1 is a schematic block diagram of one presently preferred embodiment of a PLC information transmission system utilizing the methods of the present invention.

Referring now to FIG. 1, a power line carrier (PLC) communication system 10 utilizes at least one receiver means 11 for recovering information transmitted by each of at least one transmitter means 12. The information is transmitted via at least one conductor 14 of a power circuit connecting at least one power-providing source 16 to at least one power-utilizing load 18. In the typical power circuit contemplated, the source voltage $V_s$ is relatively large, i.e. greater than about 100 $V_{rms}$, and the range of permissible load currents $I_L$, while directly determined by the individual load impedances $Z_L$, are generally in the multi-ampere range, and can be as great as several hundred amperes. Illustratively, the power line communications (PLC) system 10 has a plurality N of communications receivers 11-1, ..., 11-J, ..., 11-N, each having an associated input 11-1a, ..., 11-Ja, ..., 11-Na coupled to conductor 14, either directly or indirectly, as required both by the particular circuitry utilized for the receiver front end and by the dictates of safety and other concerns. The design of receivers 11, to recover information and provide that information as analog and/or digital data at each externally-available output port X1, ..., XJ, ..., XN each connected to the associated receiver output 11-1b, ..., 11-Jb, ..., 11-Nb, is well known to those skilled in the art; the receiver can be designed to respond to either the flow of PLC signal current in conductor 14, or to the PLC signal voltage present along conductor 14, with respect to a system ground potential, responsive to the PLC current flowing through one of load impedances $Z_L$.

Each of the at least one system transmitter means 12 receives an externally-provided information signal, such as an external signal voltage $V_e$ provided to an information input terminal 12a, with respect to a signal common potential at terminal 12b, for determining the state of that PLC signal characteristic which is to be varied for transmission of the information. For purposes of illustration only, and not by way of limitation, data transmission by frequency-shift keying (FSK) is described; the information signal $V_e$ will be assumed to be a substantially constant amplitude signal switched between different ones of a plurality of relatively low frequencies, with each frequency corresponding to a different digital data state. This signal is applied from transmitter input 12a into the local data input 20a of a signal processing electronics means 20. Processing electronics means 20 can contain any suitable configuration of electronic means (filters, amplifiers, frequency changers, and the like) necessary to provide a PLC carrier signal, at a desired PLC carrier frequency $F_{plc}$, with required amplitude, phase and the like characteristics. The PLC carrier signal is provided as a differential signal at a pair of processing means differential output terminals 20b and 20c. This differential signal is applied to the differential inputs 22a and 22b of a differential amplifier means 22, having its differential outputs 22c and 22d respectively connected to transmitter output terminals 12c and 12d, respectively. Differential amplifier 22 can be any one of the plethora of differential power amplifiers known to the art (such as those based upon a differential video amplifier, such as the Fairchild type μA733 integrated circuit, the Texas Instruments type TL592 integrated circuit, and the like, with additional power driver circuitry, of integrated or discrete type, as may be required). In accordance with one aspect of the invention, the output impedance $Z_o$ of amplifier 22 is characterized by a low impedance value at the power line frequency, even if the output impedance at the PLC signal frequency is at least one order of magnitude greater. The power frequency (e.g. 60 Hz) output impedance of amplifier 22 is selected to be low enough to prevent the saturation of a high-permeability core 24c of an associated current transformer means 24 having its primary winding 24p, with a first number N1 of turns (which are relatively closely coupled to the core), connected to the transmitter output terminals 12c and 12d for inducing the PLC signal current $I_l$ to flow in the transformer secondary winding 24s, which here comprises a portion of the system power conductor 14. In general, N1 is greater than N2 and secondary winding 24s is relatively loosely coupled to core 24c. In particular, the number N2 of secondary winding turns is made equal to one; this signal turn is only a length of conductor 14. The transformer core 24c is provided with some means, such as a hinge 24h and the like, to allow the core to be opened and slipped about the power conductor 14, such that interruption of the continuity of conductor 14 does not occur. It will be seen that the transmitter PLC output current $I_o$ is multiplied in magnitude by the transformer ratio N1/N2=N1, so that the signal current $I1=N1 \cdot I_o$. In conjunction with the single turn secondary, the characteristics of the core of transmitter-coupling transformer means 24 are selected to prevent core 24c from saturating due to the flow of the maximum magnitude of power conductor current $I_L$, so that the PLC signal current I1 can always be coupled into the transformer secondary winding 24s. If chase-type operation is desired (i.e. operation wherein the operational power to drive amplifier 22, and possibly also the active electronic portions of processing means 20, is obtained from the power frequency current $I_L$ flowing through the transmitter-coupling transformer secondary winding 24s) then the video amplifier 22 output impedance $Z_O$ at the power line frequency will be selected to be high enough to permit the development of a desired voltage $V_P$, across the output impedance $Z_o$ and between terminals 12c and 12d, sufficient to enable operation of the active amplifier and/or processing means, yet low enough to prevent transmitter-coupling transformer 24 from saturating.

In accordance with another principle of the present invention, the PLC signal current $I_o$ injected into the transmitter-coupling transformer primary winding is determined not only by the characteristics of the externally-provided data signal $V_e$ at input 12a, but also by a signal $V_{plc}$ provided by another set of transmitter inputs 12e and 12f. This signal $V_{plc}$ can be a feedback signal which is responsive to the PLC signal current I2 flowing through another portion of a system conductor (which can, but need not, be conductor 14). Thus, if the first PLC current I1 is not the same as the second PLC current I2, as by an intermediate conductor portion 14c being removed and replaced with an impedance, an open circuit and/or transformer and the like, then the actual PLC current I2 flowing through the M1 turns of the primary winding 26p of the pick-up transformer means 26 will induce a feedback current $I_f$ to flow in the M2 turns of the pick-up transformer means secondary winding 26s. While not specifically shown, pick-up transformer means core 26c may be of the split/hinged variety, similar to the core 24c, to enable core 26 to be placed about its associated conductor. Advantageously, the pick-up transformer means primary winding 26p is a single turn (M1=1), and has a multiturn secondary winding 26 (M2>1). Thus, a feedback current $I_f$ may be provided at feedback input terminal 12e, with respect to terminal 12f as by operation of a feedback switching means 28 to connect the first selectable contact 28a thereof to the common contact 28c thereof. Equally as useful is the providing of a feedback voltage at terminal 28a, by the flow of feedback current $I_f$ through an equivalent feedback impedance $Z_f$ (as shown in broken line); the voltage and/or current can be referenced to circuit common potential, as by connection of terminal 28d to circuit common potential (also shown in broken line) if desired. Similarly, the feedback voltage can be provided by direct connection of the remaining switch terminal 28b to a direct system power conductor 14, as at connection 30; use of a resistive or reactive voltage divider, between contact 28b and connection 30 is also contemplated. Thus, while the signal at processing electronic means feedback input terminals 20c and 20d can be a feedback current, the equivalent voltage $V_{plc}$ is selected for use herein, by way of illustration only.

The feedback voltage can be operated upon in any number of fashions, as required by the particular system, to generate a feedback control signal $V_c$. This signal can be, as shown, arithmetically processed to have a characteristic thereof varied by the externally provided data voltage $V_e$ at processing means input 20a, so that a PLC-frequency waveform, related to both $V_c$ and $V_e$ characteristics, is applied to the inputs of differential amplifier. In the specific illustration, noise and other deleterious portions of the feedback voltage is first removed by bandpass filtering in a first bandpass filter means 42. The filtered waveform is provided to one input of a first multiplier means 44, here acting as a signal frequency down-converter. A second input of mixer 44 receives a PLC center frequency $F_{plc}$ signal from oscillator means 46; the conversion means 44 output provides, in part, a baseband signal to amplifier 48.

The baseband PLC feedback signal can now, for example, be lowpass filtered in filter 50, to remove unwanted conversion products and the like. The baseband compensation signal $V_c$ at the output of lowpass filter 50 can be combined in operational amplifier 52 with the externally-provided data signal $V_e$ to be transmitted. Thus, the fedback and processed compensation voltage $V_c$ is applied through an input resistance 54a, of magnitude $R_i$, to the inverting input 52a of the operational amplifier. The incoming data voltage $V_e$ is coupled to the non-inverting input 52b of the operational amplifier. A feedback resistance 54b, of magnitude $R_f$, is connected between input 52a and the operational amplifier output 52c. The resulting signal $(V_e(1+R_f/R_i)-V_c(R_f/R_i)$ mixed in an up-conversion multiplier/mixer means 56 with the PLC frequency carrier waveform. The resulting signal, centered about the PLC frequency $F_{plc}$, is bandpass filtered in second bandpass filter means 58, and provides the differential drive signal, at terminals 20b and 20c, which is utilized to determine the PLC signal current $I_o$ driving the transmitter-coupling transformer primary winding 24p.

Figure 2:
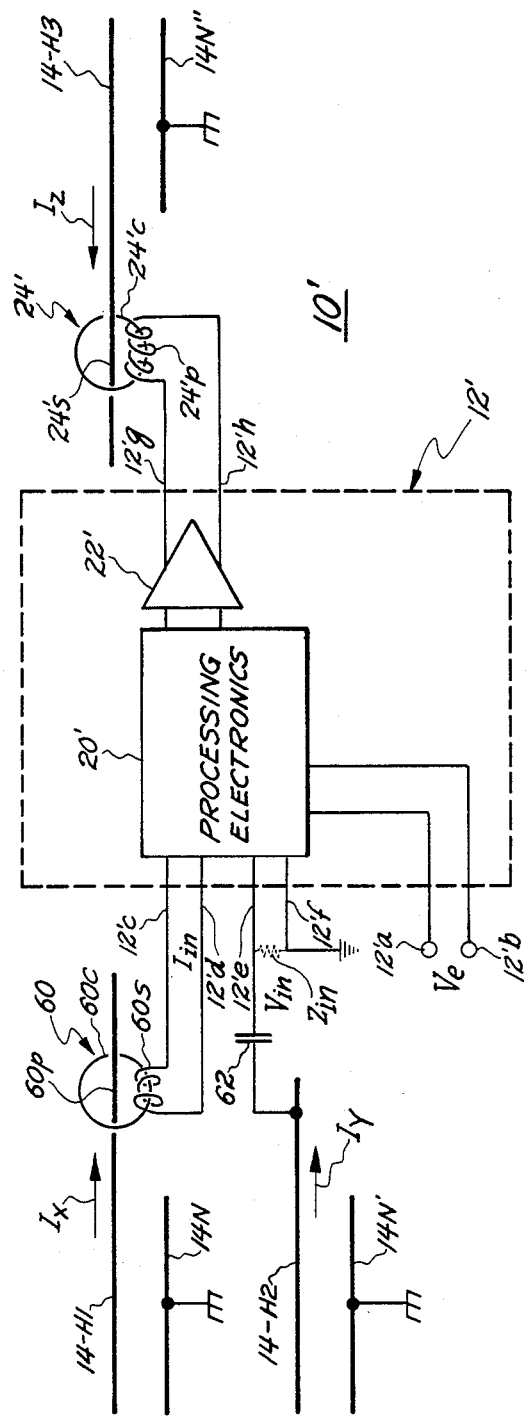
FIG. 2 is a schematic block diagram of another presently preferred embodiment of the present invention.

Referring now to FIG. 2, a portion of another PLC system 10' is shown; only a single transmitter means 12' is illustrated, although it should be understood that a plurality of such transmitters can be utilized in any system. Transmitter 12' receives, at a first pair of input terminals 12'a and 12'b, a local information signal $V_e$, and receives a plurality of other PLC input signals, each of which may be in the form of either an input current $I_{in}$, as might flow between a second pair of input terminals 12'c and 12'd, or an input feedback voltage $V_{in}$, as might appear between another pair of input terminals 12'e and 12'f, and the like. Thus, the PLC inputs to transmitter 12' are at least one signal at at least one PLC frequency; each signal can, but need not, be a portion of the signal output from transmitter means outputs 12'g and 12'h, and the like. Therefore, the input signal can be from the same conductor carrying the output signal, from a conductor carrying an entirely different signal, or any combination thereof. FIG. 1 illustrates the feedback situation (i.e. the input PLC frequency signal is from the same conductor into which the output PLC frequency signal has been introduced by the same transmitter means; FIG. 2 illustrates the case where one, or several, input PLC frequency signals are from conductors other than the conductor into which the output PLC frequency signal is introduced. Thus, the signalling current $I_x$ flowing in a first "hot" conductor section 14-H1 is used as the primary current in a one-turn primary winding 60p of a first input-transformation means 60. Core 60c couples the PLC current-induced flux into a secondary winding 60s, inducing the input current $I_{in}$ flow at the first transmitter means input 12'c and 12'd. Another PLC frequency current $I_i$ flows in a second "hot" conductor 14-H2; a high-impedance tapping circuit (such as comprised of a coupling capacitance 62 in series with the effective input impedance $Z_{in}$ of the transmitter means second input terminals 12'e/12'f) is utilized as a load and voltage divider, to provide the second PLC signal voltage $V_{in}$. Each of hot conductors 14-H1 and 14-H2 are, typically, different conductors, such that PLC currents $I_x$ and $I_y$ are different. By way of illustration, a third hot conductor 14-H3 has the PLC current $I_z$ induced in that section thereof which forms the secondary winding 24'f of an output transformer means 24', having its primary winding 24'p connected to the transmitter means output terminals 24'g and 24'h. It should be understood that the associated neutral conductors 14N, 14N' and 14N'' may all be connected to earth ground, and that the output conductor 14-H3 can be an extended portion of one of the input conductors 14-H1 or 14-H2, although the plurality of conductors can be entirely separated from one another, in the more general situation. Thus, if there is an open circuit between one portion of a conductor (as might be represented by conductor section 14-H1) and another conductor section (as represented by conductor section 14-H3), it will be seen that the PLC communications signal can be linked from one to the other. Similarly, it can be seen that intermediate short-circuits, high impedances, low impedances or any other deleterious condition can be effectively "removed" from a PLC communications system by use of at least one transmitter means 12'. It will also be seen that, even if additional information is not added (i.e. the external information signal $V_e$ is not present, and the involved transmitter means acts as a repeater) the system can effectively provide a flow of power line carrier information signal to all necessary conductors of the power line.

While several presently preferred embodiments of portions of my apparatus for PLC information communication, and the underlying methodology thereof, are specifically described herein, it will be apparent to those skilled in the art that many modifications and variations can be made without departing from the spirit and intent of this invention. Accordingly, it is my desire that this invention be limited only the scope of the appending claims, and not by the specific details and instrumentalities presented by way of presently preferred embodiment descriptions herein.

What is claimed is:

1. A method for transmission of information over at least one conductor of a power distribution system, comprising the steps of:
   (a) receiving, at a transmitter, a local data signal containing the information to be transmitted;
   (b) receiving, at the transmitter, at least one PLC signal, each at a power-line-carrier (PLC) communications frequency and each from an associated first conductor portion of the system;
   (c) processing the local data signal and the at least one PLC signal to generate in the transmitter an output PLC signal, also at the PLC frequency;
   (d) coupling at least a portion of the output PLC signal through the non-saturating core of a transmitter-coupling current transformer to inject a PLC current into a second conductor portion of the system; and
   (e) recovering the transmitted information with a receiver connected to a system conductor at a location different from the location of the transmitter.

2. The method of claim 1, wherein the first and second conductor portions are both part of the same physical conductor.

3. The method of claim 2, wherein the PLC signal received by the transmitter in step (b) is a feedback current signal coupled from the first conductor portion by a current transformer.

4. The method of claim 1, wherein the first and second conductor portions are each part of a different physical conductor.

5. The method of claim 4, wherein step (b) includes the steps of: receiving a plurality of different PLC signals at the transmitter; and arithmetically processing the plurality of different received signals to generate a single resulting PLC signals to be combined with the local data signal to generate the output PLC signal.

6. The method of claim 4, further comprising the steps of: providing a repeater transmitter; and repeating all of steps (b)-(d) at the repeater transmitter, without repeating step (a) thereat.

7. The method of claim 1, wherein step (c) includes the steps of: frequency-down-converting each of the at least one PLC signals to baseband; adding at least one of the baseband signals to the local data signal to generate a summed signal; and then up-converting the frequency of the summed signal to generate the output PLC signal.

8. The method of claim 7, further comprising the step of bandpass-filtering each PLC signal prior to down-conversion.

9. The method of claim 7, further comprising the step of bandpass-filtering the output PLC signal after up-conversion.

10. The method of claim 1, further comprising the step of amplifying the output PLC signal in an amplifier having an output impedance which is at least one order of magnitude lower at the power-distribution frequency than its impedance at any PLC frequency.

11. The method of claim 10, further comprising the step of selecting the number of turns of the secondary winding of the transformer to be less than the number of primary winding turns.

12. The method of claim 11, wherein the secondary winding is a single turn of the associated system conductor.

13. A system for the transmission of information over at least one conductor of a power distribution system, comprising:
   at least one receiver means for recovering information modulated onto at least one carrier signal at a power-line-carrier (PLC) communications frequency at least two orders of magnitude greater than the power frequency in the distribution system;
   at least one transmitter means for providing the at least one carrier signal responsive to both a local information signal and a control signal;
   at least one current transformer means, each having a magnetic core which does not saturate at any magnitude of distribution system load current flowing therethrough, each for coupling the at least one carrier signal from an associated transmitter means onto the associated system conductor; and
   at least one means, associated with each transmitter means, for coupling a portion of the PLC signal on a selected one of the at least one distribution system conductor as the control signal to that selected transmitter means.

14. The system of claim 13, wherein the coupling means provides a control signal which is a feedback signal from the same conductor receiving the carrier signal from that transmitter means.

15. The system of claim 13, wherein the coupling means provides a control signal from a different conductor than the conductor receiving the carrier signal from that transmitter means.

16. A transmitter for use in a power-line-carrier (PLC) information communication system, comprising:
   a differential amplifier having a pair of differential inputs and a pair of differential outputs between which appears an output signal with increased amplitude with respect to the amplitude of an input signal applied between said pair of inputs, said differential amplifier having an output impedance at a power-distribution frequency which is at least one order of magnitude less than the output impedance at a PLC frequency at least two orders of magnitude greater than the power-distribution frequency;
   means for receiving a local data signal containing information to be communicated over the system;
   means for receiving a control signal, at the PLC frequency, from the system; and
   means for processing the local and control signals to provide to the differential amplifier the input signal at the PLC frequency.

17. The transmitter of claim 16, wherein said processing means comprises: means for down converting the frequency of the control signal to baseband; means for adding the local data signal to the baseband signal to generate a summed signal; and means for up converting the summed signal to generate a processed signal for use as the PLC frequency input signal to the differential amplifier.

18. The transmitter of claim 17, wherein the processing means further includes means for bandpass filtering the control signal.

19. The transmitter of claim 18, wherein the processing means further includes means for bandpass filtering the up-converted processed signal.

20. The transmitter of claim 18, further comprising means, used with the converting means, for establishing the PLC frequency.

* * * * *